(12) United States Patent
Ozeki et al.

(10) Patent No.: US 11,611,093 B2
(45) Date of Patent: Mar. 21, 2023

(54) FUEL CELL SYSTEM

(71) Applicant: TOYOTA JIDOSHA KABUSHIKI KAISHA, Toyota (JP)

(72) Inventors: Mahiro Ozeki, Nisshin (JP); Tomotaka Ishikawa, Nagoya (JP); Yusuke Nishida, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 17/224,267

(22) Filed: Apr. 7, 2021

(65) Prior Publication Data

US 2021/0376350 A1 Dec. 2, 2021

(30) Foreign Application Priority Data

May 28, 2020 (JP) .............................. JP2020-092981

(51) Int. Cl.
*H01M 8/04701* (2016.01)
*H01M 8/04223* (2016.01)

(52) U.S. Cl.
CPC ... *H01M 8/04708* (2013.01); *H01M 8/04253* (2013.01); *H01M 8/04268* (2013.01)

(58) Field of Classification Search
None
See application file for complete search history.

(56) References Cited

U.S. PATENT DOCUMENTS

| | | | | |
|---|---|---|---|---|
| 2003/0049504 A1* | 3/2003 | Wheat | ............... | H01M 8/04007 429/442 |
| 2009/0317678 A1* | 12/2009 | Bono | ................ | H01M 8/04141 429/436 |
| 2012/0100449 A1* | 4/2012 | Araki | ................ | H01M 8/04768 429/429 |
| 2016/0380283 A1* | 12/2016 | Yamada | ............ | H01M 8/04228 429/429 |
| 2020/0388862 A1* | 12/2020 | Miyazaki | .......... | H01M 8/04365 |

FOREIGN PATENT DOCUMENTS

| | | |
|---|---|---|
| JP | 2017195021 A | 10/2017 |
| JP | 2018156822 A | 10/2018 |

\* cited by examiner

*Primary Examiner* — Haroon S. Sheikh
(74) *Attorney, Agent, or Firm* — Dickinson Wright, PLLC (57) ABSTRACT

A fuel cell system includes a fuel cell, a first temperature sensor configured to acquire a first temperature that is a temperature of the fuel cell, a plurality of accessories that is used to operate the fuel cell, a second temperature sensor configured to acquire a second temperature that is a temperature of at least any one of the plurality of accessories, and a controller configured to perform control on the plurality of accessories to execute a warming-up operation of the fuel cell. The controller is configured to execute the warming-up operation when any of a first condition that the first temperature is lower than a predetermined first threshold temperature and a second condition that the first temperature is equal to or higher than the first threshold temperature and the second temperature is lower than a predetermined second threshold temperature is satisfied.

7 Claims, 5 Drawing Sheets

FIG. 5 ure of a cooling medium outlet acquired by a temperature sensor provided in a cooling medium circulation system of a fuel cell stack is below a freezing point at the time of startup, executes a warming-up operation of the fuel cell stack until a cooling medium temperature at the cooling medium outlet exceeds a warming-up end temperature set in advance (for example, Japanese Unexamined Patent Application Publication No. 2017-195021 (JP 2017-195021 A)).

FUEL CELL SYSTEM

CROSS-REFERENCE TO RELATED APPLICATION

This application claims priority to Japanese Patent Application No. 2020-092981 filed on May 28, 2020, incorporated herein by reference in its entirety.

BACKGROUND

1. Technical Field

The present disclosure relates to a fuel cell system.

2. Description of Related Art

There is known a fuel cell system that, when a temperature of a cooling medium outlet acquired by a temperature sensor provided in a cooling medium circulation system of a fuel cell stack is below a freezing point at the time of startup, executes a warming-up operation of the fuel cell stack until a cooling medium temperature at the cooling medium outlet exceeds a warming-up end temperature set in advance (for example, Japanese Unexamined Patent Application Publication No. 2017-195021 (JP 2017-195021 A)).

SUMMARY

Solely a temperature of the fuel cell stack is taken into consideration in the warming-up operation of the fuel cell system, and there is room for further improvement from a viewpoint of the startup performance of the entire fuel cell system.

The present disclosure can be realized as the following aspect.

(1) An aspect of the present disclosure relates to a fuel cell system. The fuel cell system includes a fuel cell, a first temperature sensor, a plurality of accessories, a second temperature sensor, and a controller. The first temperature sensor is configured to acquire a first temperature that is a temperature of the fuel cell. The plurality of accessories are used to operate the fuel cell. The second temperature sensor is configured to acquire a second temperature that is a temperature of at least any one of the plurality of accessories. The controller is configured to perform control on the plurality of accessories to execute a warming-up operation of the fuel cell. The controller is configured to execute the warming-up operation when any of a first condition that the first temperature is lower than a predetermined first threshold temperature and a second condition that the first temperature is equal to or higher than the first threshold temperature and the second temperature is lower than a predetermined second threshold temperature is satisfied. With the fuel cell system of this aspect, even though the first temperature that is the temperature of the fuel cell is higher than the first threshold temperature, when the second temperature that is the temperature of the accessory is lower than the second threshold temperature, the controller executes the warming-up operation. Even though the temperature of the fuel cell is high to such an extent that the warming-up operation is not needed, when the temperature of the accessory is low, the warming-up operation is executed. Accordingly, it is possible to reliably suppress or restrain freezing of the accessory, and to increase the startup performance of the entire fuel cell system.

(2) In the fuel cell system according to the aspect, the second temperature may be a temperature of an accessory that shows a temperature lower than the temperature of the fuel cell in a period during which the fuel cell system is stopped, among the plurality of accessories. With the fuel cell system of this aspect, the temperature of the accessory that shows the temperature lower than the temperature of the fuel cell is used for a start condition of the warming-up operation, it is possible to more reliably suppress or restrain freezing of the accessory.

(3) In the fuel cell system according to the aspect, the plurality of accessories may include an intercooler configured to cool cathode gas that is supplied to a cathode of the fuel cell. The second temperature may be a temperature of the intercooler. With the fuel cell system of this aspect, the temperature of the intercooler that is likely to be disposed at a position susceptible to an outside air temperature and tends to standardly include a temperature sensor configured to acquire a temperature of cathode gas is acquired as the second temperature. Accordingly, it is possible to acquire the temperature of the accessory that shows a low temperature, and to efficiently determine a need for the warming-up operation, without adding a temperature sensor that is used for the start condition of the warming-up operation.

(4) In the fuel cell system according to the aspect, the controller may be configured to execute the warming-up operation after performing control on the plurality of accessories to execute anode gas filling processing of filling an anode of the fuel cell with anode gas when the first condition is satisfied, and execute the warming-up operation without executing the anode gas filling processing when the second condition is satisfied. With the fuel cell system of this aspect, hydrogen filling processing is executed solely when the temperature of the fuel cell is low to such an extent that the warming-up operation is needed, whereby it is possible to suppress unneeded consumption of fuel gas.

(5) In the fuel cell system according to the aspect, the controller may be configured to, when temperatures of two or more accessories among the plurality of accessories are acquired as the second temperature to execute the warming-up operation, end the warming-up operation when the temperatures of all of the two or more accessories are equal to or higher than a predetermined end threshold temperature. With the fuel cell system of this aspect, the temperatures of the accessories are used for a completion condition of the warming-up operation, whereby it is possible to sufficiently increase the temperature of each accessory and to reliably suppress or restrain freezing of each accessory even though a gradient of an increase in temperature of each accessory due to the warming-up operation is different, such as when each accessory has a different heat capacity or has a different distance from the fuel cell.

The present disclosure can be realized in various aspects other than the above-described aspect, and for example, can be realized in aspects of a vehicle in which a fuel cell system is mounted, a control method of a fuel cell system, a method of determining a need for a warming-up operation, a computer program for realizing such methods, a storage medium storing such a computer program, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
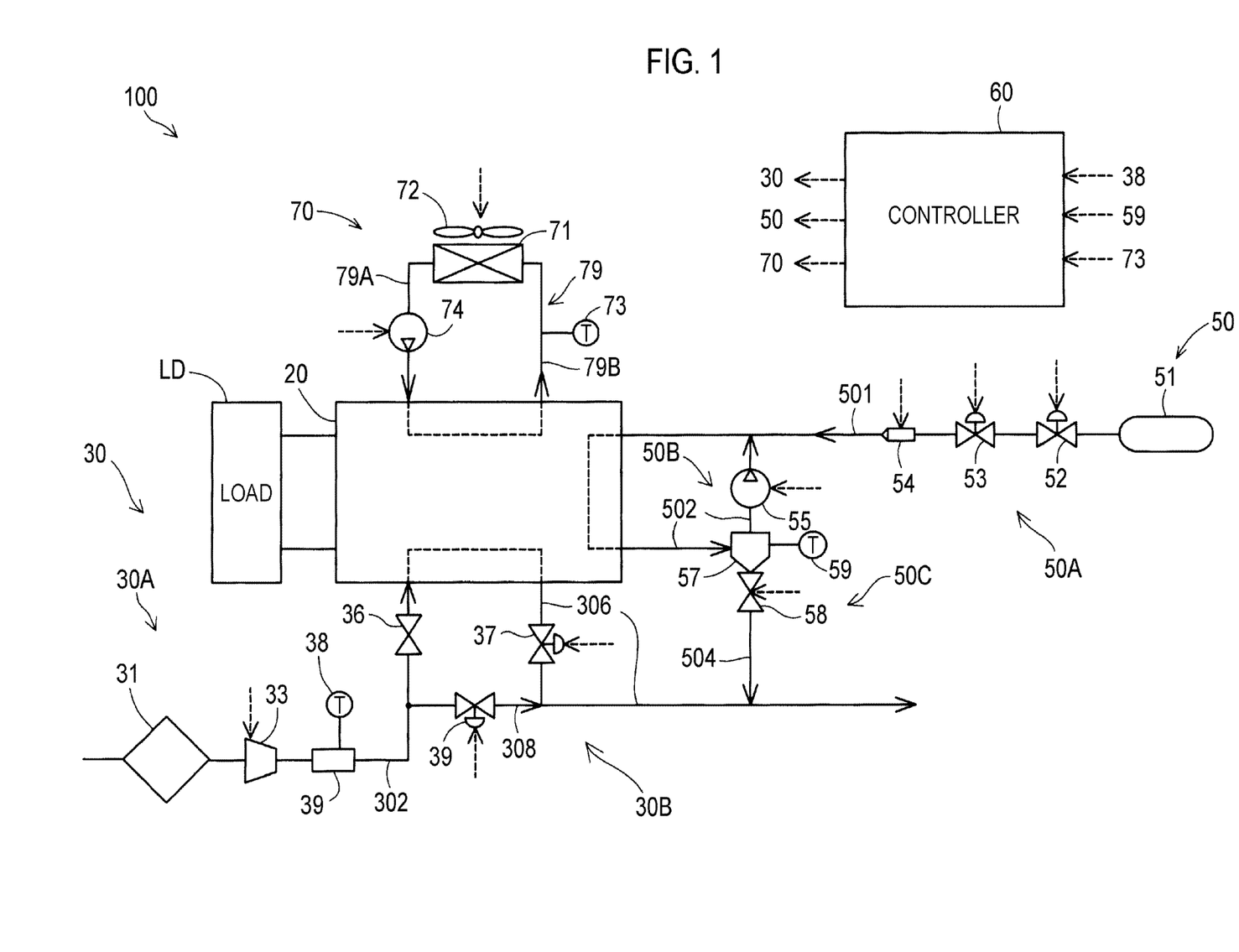
FIG. 1 is an explanatory view showing the configuration of a fuel cell system of a first embodiment.

FIG. 1 is an explanatory view showing the configuration of a fuel cell system 100 in the embodiment. The fuel cell system 100 is mounted in, for example, a fuel cell vehicle that has a fuel cell 20 as a drive source. The fuel cell system 100 drives various devices included in a load LD using generated electric power of the fuel cell 20. The fuel cell system 100 has the fuel cell 20, a controller 60, an oxidant gas supply-discharge system 30, a fuel gas supply-discharge system 50, and a cooling medium circulation system 70. The fuel cell system 100 may further include a secondary battery that functions as an electric power source to the load LD, along with the fuel cell 20. The fuel cell system 100 may be used for a household power supply, stationary electric power generation, and the like, in addition to the fuel cell vehicle.

The fuel cell 20 has a stack structure in which a plurality of unit cells having a membrane electrode assembly (MEA) with both electrodes of an anode and a cathode bonded to both sides of an electrolyte membrane is laminated. The fuel cell 20 is a solid polymer fuel cell that generates electric power with supply of, as reactant gas, hydrogen gas as fuel gas and air as oxidant gas, and drives the load LD using the generated electric power. Examples of the load LD include a drive motor that generates drive power of the fuel cell vehicle and a heater that is used for air conditioning in the fuel cell vehicle. The fuel cell 20 is not limited to a solid polymer type, and may be various types of fuel cells, such as a phosphoric acid type, a molten carbonate type, and a solid oxide type.

The controller 60 is configured of a microcomputer including a microprocessor that executes a logical operation, and a memory, such as a ROM or a RAM. The controller 60 performs various kinds of control of the fuel cell system 100 including operation control of a plurality of accessories that is used to operate the fuel cell 20, by the microprocessor executing a program stored in the memory. Examples of "the accessories" include respective valves included in the oxidant gas supply-discharge system 30, the fuel gas supply-discharge system 50, and the cooling medium circulation system 70, an injector 54, a gas-liquid separator 57, an air compressor 33, an intercooler 35, a circulation pump 55, and a cooling medium circulation pump 74. Each accessory is thermally coupled to the fuel cell 20, and for example, a temperature of each accessory can increase with an increase in temperature of the fuel cell 20. The thermal coupling to the fuel cell 20 can be realized, for example, by connection to the fuel cell 20 through a member, such as a heat pipe or a heat pump, or a pipeline, in addition to a cooling system that circulates a cooling medium, such as the cooling medium circulation system 70, disposition in the same space as the fuel cell 20, or the like. Note that each valve, the injector 54, the air compressor 33, the circulation pump 55, and the cooling medium circulation pump 74 may be included in the above-described load LD.

The oxidant gas supply-discharge system 30 includes an oxidant gas supply system 30A that has a cathode gas supply function, and an oxidant gas discharge system 30B that has a cathode gas discharge function and a cathode gas bypass function. The cathode gas supply function means a function of supplying air including oxygen as cathode gas to the cathode of the fuel cell 20. The cathode gas discharge function means a function of discharging, to an outside, cathode off-gas that is exhaust gas to be discharged from the cathode of the fuel cell 20. The cathode gas bypass function means a function of discharging a part of supplied cathode gas to the outside while restraining supply to the fuel cell 20.

The oxidant gas supply system 30A supplies air as cathode gas to the cathode of the fuel cell 20. The oxidant gas supply system 30A has a cathode supply pipe 302, an air cleaner 31, an air compressor 33, an intercooler 35, an IC temperature sensor 38, and an inlet valve 36.

The cathode supply pipe 302 is a pipeline that is connected to an inlet of the cathode of the fuel cell 20, and is a supply flow passage of air to the cathode of the fuel cell 20. The air cleaner 31 is provided on a side closer to an introduction port side of air than (upstream of) the air compressor 33 in the cathode supply pipe 302 and removes a foreign substance in air supplied to the fuel cell 20. An outside air temperature sensor that measures a temperature of outside air may be provided upstream of the air cleaner 31.

The air compressor 33 is provided upstream of the fuel cell 20 in the cathode supply pipe 302. The air compressor 33 compresses air taken through the air cleaner 31 and pumps the compressed air to the cathode. As the air compressor 33, for example, a turbo compressor is used. The drive of the air compressor 33 is controlled by the controller 60.

The intercooler 35 is provided between the air compressor 33 in the cathode supply pipe 302 and the fuel cell 20. The intercooler 35 cools cathode gas that is compressed and increases to a high temperature by the air compressor 33. A cooling method of cathode gas by the intercooler 35 can be realized, for example, by circulating a cooling medium into the intercooler 35. A pipeline that branches off from a cooling medium circulation path 79 may be connected to the intercooler 35 and may circulate the cooling medium of the cooling medium circulation system 70 into the intercooler 35 to cool the cathode gas. The IC temperature sensor 38 acquires a temperature of the intercooler 35. In general, the intercooler 35 is provided in the vicinity of an introduction port of outside air. For this reason, the intercooler 35 is likely to decrease in temperature due to the influence of an outside air temperature, and tends to standardly include the IC temperature sensor 38 to acquire the temperature of cathode gas to be introduced into the fuel cell 20. In the embodiment, the intercooler 35 shows a temperature lower than the temperature of the fuel cell 20 in a period during which the fuel cell system 100 is stopped, and shows a lowest temperature among the accessories of the fuel cell system 100. The description "the accessory showing the temperature lower than the temperature of the fuel cell 20 among the accessories" means an accessory that is thermally coupled to the fuel cell 20 and has a temperature to be acquired showing a tendency to be lower than the temperature of the fuel cell 20, among accessories, the temperatures of which can be acquired directly or indirectly by the fuel cell system 100. The description "the accessory showing the lowest temperature among the accessories" means an accessory that is thermally coupled to the fuel cell 20 and has a temperature to be acquired showing a tendency to be the lowest, among the accessories, the temperatures of which can be acquired directly or indirectly by the fuel cell system 100. A temperature of an accessory is hereinafter also referred to as a "second temperature", and a temperature sensor that acquires a temperature of an accessory is hereinafter also referred to as a "second temperature sensor". The temperature of the intercooler 35 corresponds to the second temperature, and the IC temperature sensor 38 corresponds to the second temperature sensor. An accessory for which the second temperature is acquired may be set in advance, for example, based on a result of a test or the like or may be appropriately changed based on the temperatures of the accessories acquired by the fuel cell system 100. The temperature of the accessory is not limited to the temperature of the accessory itself and may be the temperature of the accessory to be acquired indirectly using a temperature in the vicinity of the accessory or may be an estimated value of the temperature of the accessory that is calculated using a temperature of a part other than the accessory. For example, the temperature of the intercooler 35 is not limited to the temperature of the intercooler 35 itself, and a temperature of air flowing through the intercooler 35 or a temperature of the cathode supply pipe 302 in the vicinity of the intercooler 35 may be used or an estimated value of the temperature of the intercooler 35 that is calculated using such temperatures. When the temperature of the accessory is lower than, for example, a freezing point, freezing of the accessory or liquid water in the accessory can influence the startup of the fuel cell 20. A measurement result of the temperature of the intercooler 35 by the IC temperature sensor 38 is transmitted to the controller 60.

The inlet valve 36 controls flowing of cathode gas into the cathode of the fuel cell 20. The inlet valve 36 is an on-off valve that is mechanically opened when cathode gas at predetermined pressure flows.

The oxidant gas discharge system 30B has a cathode off-gas discharge function, and includes an exhaust gas pipe 306 and a bypass pipe 308. The exhaust gas pipe 306 is a discharge flow passage of cathode off-gas that is connected to an outlet of the cathode of the fuel cell 20. The exhaust gas pipe 306 guides exhaust gas of the fuel cell 20 including the cathode off-gas into the air. Exhaust gas discharged from the exhaust gas pipe 306 into the air includes anode off-gas or air flows out from the bypass pipe 308 in addition to cathode off-gas.

The exhaust gas pipe 306 is provided with an outlet valve 37. The outlet valve 37 is disposed on a side closer to the fuel cell 20 than a connection position in the exhaust gas pipe 306 to the bypass pipe 308. As the outlet valve 37, for example, an electromagnetic valve or an electrified valve can be used. The controller 60 adjusts back pressure of the cathode of the fuel cell 20 by adjusting an opening degree of the outlet valve 37.

The bypass pipe 308 is a pipeline that connects the cathode supply pipe 302 and the exhaust gas pipe 306 without passing through the fuel cell 20. The bypass pipe 308 is provided with a bypass valve 39. As the bypass valve 39, for example, an electromagnetic valve or an electrified valve can be used. In a case where the bypass valve 39 is opened, a part of cathode gas flowing in the cathode supply pipe 302 flows into the exhaust gas pipe 306. The controller 60 adjusts a flow rate of cathode gas flowing into the bypass pipe 308 by adjusting an opening degree of the bypass valve 39.

The fuel gas supply-discharge system 50 includes a fuel gas supply system 50A having an anode gas supply function, a fuel gas discharge system 50C having an anode gas discharge function, and a fuel gas circulation system 50B having an anode gas circulation function. The anode gas supply function means a function of supplying anode gas including fuel gas to the anode of the fuel cell 20. The anode gas discharge function means a function of discharging, to the outside, anode off-gas that is exhaust gas to be discharged from the anode of the fuel cell 20. The anode gas circulation function means a function of circulating hydrogen included in anode off-gas into the fuel cell system 100.

The fuel gas supply system 50A supplies anode gas including hydrogen to the anode of the fuel cell 20. The fuel gas supply system 50A includes an anode supply pipe 501, a fuel gas tank 51, an on-off valve 52, a regulator 53, and an injector 54.

The anode supply pipe 501 is a pipeline that connects the fuel gas tank 51 as a supply source of hydrogen, and an inlet of the anode of the fuel cell 20, and supplies anode gas to the fuel cell 20. The on-off valve 52 is provided in the vicinity of an outlet of the fuel gas tank 51 in the anode supply pipe 501. The on-off valve 52 is also referred to as a main stop valve, and allows hydrogen in the fuel gas tank 51 to flow to a downstream side. The regulator 53 is provided on a side closer to the fuel cell 20 than (downstream of) the on-off valve 52 in the anode supply pipe 501. The regulator 53 adjusts pressure of hydrogen upstream of the injector 54 under the control of the controller 60.

The injector 54 is provided downstream of the regulator 53 in the anode supply pipe 501. The injector 54 is an on-off valve that is controlled by the controller 60 and is electromagnetically driven depending on a set drive period or valve opening time. The injector 54 adjusts a hydrogen amount of anode gas that is supplied to the fuel cell 20.

The fuel gas circulation system 50B separates a liquid component from anode off-gas discharged from the anode of the fuel cell 20 and circulates anode-off gas into the anode supply pipe 501. The fuel gas circulation system 50B has an anode circulation pipe 502, a gas-liquid separator 57, a circulation pump 55, and a separator temperature sensor 59.

The anode circulation pipe 502 is connected to the anode outlet of the fuel cell 20 and the anode supply pipe 501, and guides anode off-gas discharged from the anode to the anode supply pipe 501. The gas-liquid separator 57 is provided in the anode circulation pipe 502, and separates a liquid component including vapor from the anode off-gas and stores the liquid component. The circulation pump 55 is provided between the gas-liquid separator 57 and the anode supply pipe 501 in the anode circulation pipe 502. The circulation pump 55 pumps anode off-gas flowing into the gas-liquid separator 57 to the anode supply pipe 501. The separator temperature sensor 59 acquires a temperature of the gas-liquid separator 57 as an accessory. The temperature of the gas-liquid separator 57 corresponds to a "second temperature", and the separator temperature sensor 59 corresponds to a "second temperature sensor". A measurement result by the separator temperature sensor 59 is transmitted to the controller 60. For example, the separator temperature sensor 59 may be attached to the gas-liquid separator 57 to directly acquire the temperature of the gas-liquid separator 57 or may be provided in the anode circulation pipe 502 or an anode discharge pipe 504 in the vicinity of the gas-liquid separator 57 to indirectly acquire the temperature of the gas-liquid separator 57 by calculating the temperature of the gas-liquid separator 57 using the temperature of anode gas or the pipe. The separator temperature sensor 59 may not be provided when being not used in startup processing described below.

The fuel gas discharge system 50C discharges anode off-gas or liquid water stored in the gas-liquid separator 57 to the exhaust gas pipe 306. The fuel gas discharge system 50C has the anode discharge pipe 504 and an exhaust and drain valve 58. The anode discharge pipe 504 is a pipeline that connects a discharge port of the gas-liquid separator 57 and the exhaust gas pipe 306, and discharges wastewater from the gas-liquid separator 57 and a part of anode off-gas passing through the gas-liquid separator 57 from the fuel gas supply-discharge system 50. The exhaust and drain valve 58 is provided in the anode discharge pipe 504 and opens and closes a flow passage of the anode discharge pipe 504. As the exhaust and drain valve 58, for example, a diaphragm valve can be used. When the exhaust and drain valve 58 is opened, liquid water stored in the gas-liquid separator 57 and anode off-gas are discharged into the air through the exhaust gas pipe 306.

The cooling medium circulation system 70 circulates the cooling medium into the fuel cell 20 to adjust the temperature of the fuel cell 20. As the cooling medium, for example, a nonfreezing fluid, such as ethylene glycol, water, or the like is used. The cooling medium circulation system 70 includes the cooling medium circulation path 79, the cooling medium circulation pump 74, a radiator 71, a radiator fan 72, and a fuel cell temperature sensor 73.

The cooling medium circulation path 79 has a cooling medium supply path 79A that supplies the cooling medium to the fuel cell 20, and a cooling medium discharge path 79B that discharges the cooling medium from the fuel cell 20. The cooling medium circulation pump 74 pumps the cooling medium of the cooling medium supply path 79A to the fuel cell 20. The radiator 71 dissipates heat by wind from the radiator fan 72 and cools the cooling medium flowing therethrough.

The fuel cell temperature sensor 73 acquires the temperature of the fuel cell 20. The temperature of the fuel cell 20 is not limited to the temperature of the fuel cell 20 itself, and includes a temperature of an accessory a pipeline in the vicinity of the fuel cell 20 or an estimated value of the temperature of the fuel cell 20, such as a calculated value. In the embodiment, the fuel cell temperature sensor 73 acquires a temperature of the cooling medium in the cooling medium discharge path 79B as the temperature of the fuel cell 20. The temperature of the fuel cell 20 is also referred to as a "first temperature", and the fuel cell temperature sensor 73 that acquires the temperature of the fuel cell 20 is also referred to as a "first temperature sensor". A measurement result by the fuel cell temperature sensor 73 is transmitted to the controller 60.

Figure 2:
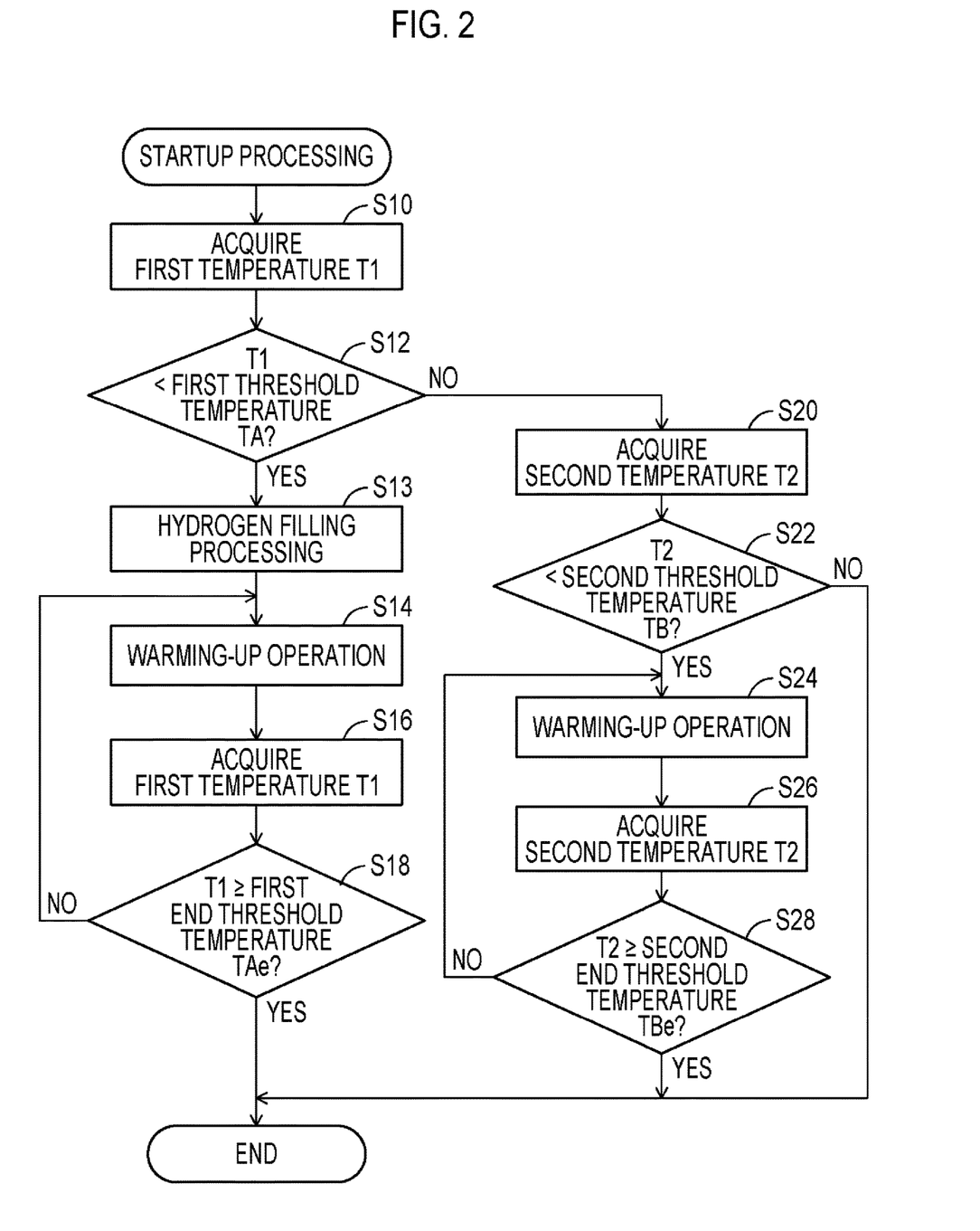
FIG. 2 is a flowchart showing startup processing that is executed by a controller.

FIG. 2 is a flowchart showing startup processing that is executed by the controller 60. The startup processing is executed by the controller 60, for example, when an operation start of the fuel cell system 100 is instructed by an activation operation, such as depression of a start switch of the fuel cell vehicle. The controller 60 operates the fuel cell 20 to start electric power generation with the start of the startup processing. More specifically, the controller 60 performs control on the respective accessories of the oxidant gas supply-discharge system 30 and the fuel gas supply-discharge system 50 to start supply and discharge of reactant gas to and from the fuel cell 20 and performs control on the respective accessories of the cooling medium circulation system 70 to start temperature control of the fuel cell 20.

The controller 60 acquires the temperature of the fuel cell 20 as a first temperature T1 (Step S10). The controller 60 acquires the temperature of the cooling medium in the cooling medium discharge path 79B acquired by the fuel cell temperature sensor 73 as the first temperature T1. The controller 60 determines whether or not a first condition that is a start condition of a warming-up operation is satisfied using the acquired first temperature T1 (Step S12). In the embodiment, the controller 60 determines that the first condition is satisfied when a measured value of the fuel cell temperature sensor 73 is lower than a predetermined temperature (hereinafter, also referred to as a "first threshold temperature TA") as a temperature needed for the warming-up operation. In the embodiment, the first threshold temperature TA is set at a freezing point. The first threshold temperature TA can be optionally set using a temperature enough to normally start up the fuel cell 20 or each accessory for use in operating the fuel cell 20. It is preferable that the first threshold temperature TA is, for example, near the freezing point. When the fuel cell 20 can be normally started up even at a temperature lower than the freezing point, the first threshold temperature TA may be set at a temperature lower than the freezing point. The first threshold temperature TA may be set at a temperature higher than the freezing point.

When determination is made that the first condition is satisfied (S12: YES), the controller 60 executes hydrogen filling processing (Step S13). The "hydrogen filling processing" is processing of introducing hydrogen gas into the anode to fill the anode with hydrogen gas enough to electric power generation of the fuel cell 20 while discharging mixed gas including an impurity present in the anode. The hydrogen filling processing is also referred to as "anode gas filling processing" or "hydrogen substitution processing". For example, when the temperature of the fuel cell 20 is low to such an extent that the warming-up operation is needed, a flow passage of fuel gas, such as the anode supply pipe 501 or the anode circulation pipe 502, is frozen and circulation of fuel gas is likely to be obstructed. For this reason, the hydrogen filling processing is preferably executed in a low temperature environment, and is more preferably executed in an environment in which the temperature of the fuel cell 20 is low to such an extent that the warming-up operation is needed. The controller 60 performs control on the on-off valve 52, the injector 54, or the like to supply hydrogen to the anode while opening the exhaust and drain valve 58 to discharge mixed gas from the anode. The controller 60 closes the exhaust and drain valve 58 to complete the hydrogen filling processing. When fuel gas can be sufficiently supplied to the fuel cell 20, such as when the temperature of the fuel cell 20 is higher than, for example, the freezing point, the hydrogen filling processing may be omitted.

In a case where the hydrogen filling processing is completed, the controller 60 executes the warming-up operation (Step S14). More specifically, the controller 60 performs control on the oxidant gas supply-discharge system 30 and the fuel gas supply-discharge system 50 such that a stoichiometric ratio of oxidant gas supplied to the fuel cell 20 is smaller than a stoichiometric ratio during a normal operation. The "stoichiometric ratio of oxidant gas" means a ratio of an actual supply amount of oxidant gas to a theoretical value of an amount of oxidant gas needed to generate requested generated electric power. With the control, since a concentration overvoltage in the cathode increases, and electric power generation efficiency of the fuel cell 20 is degraded, a heat generation amount of the fuel cell 20 increases compared to a normal operation, and a temperature increase speed of the fuel cell 20 can be increased. A stoichiometric ratio of oxidant gas during the warming-up operation can be set to, for example, about 1.0. The controller 60 controls a current of the fuel cell 20 to cause the fuel cell 20 to generate electric power with a target heat generation amount while supplying reactant gas at the stoichiometric ratio for a warming-up operation to the fuel cell 20. The controller 60 may set the target heat generation amount to a greater value as a current outside air temperature or the first temperature and the second temperature are lower.

The controller 60 acquires the first temperature T1 (Step S16), and determines whether or not a predetermined warming-up completion condition is satisfied (Step S18). More specifically, the controller 60 determines that the warming-up completion condition is satisfied when the first temperature T1 is equal to or higher than a predetermined first end threshold temperature TAe. It is preferable that the first end threshold temperature TAe is set at a temperature to such an extent that the startup performance of the fuel cell 20 is not degraded, for example, at a temperature equal to or higher than the freezing point. The first end threshold temperature TAe may be set, for example, at the same temperature of the first threshold temperature TA or may be set at a temperature higher than the first threshold temperature TA. The warming-up completion condition may be satisfied, for example, when a warming-up completion time calculated from the target heat generation amount has elapsed.

When determination is made that the first temperature T1 is equal to or higher than the first end threshold temperature TAe (S18: YES), the controller 60 completes the warming-up operation to end the startup processing and starts a normal operation of the fuel cell 20. When the warming-up completion condition is not satisfied (S18: NO), the controller 60 returns to Step S14, and continues the warming-up operation until the warming-up completion condition is satisfied.

In Step S12, when the first condition is not satisfied (S12: NO), the controller 60 acquires a second temperature T2 (Step S20). In the embodiment, the controller 60 acquires, as the second temperature T2, the temperature of the intercooler 35 as a temperature of an accessory showing the lowest temperature among the accessories in the fuel cell system 100. For example, when an accessory other than the intercooler 35 among the accessories in the fuel cell system 100 shows the lowest temperature, the temperature of the accessory may be used as the second temperature T2.

The controller 60 determines whether or not a second condition that is a start condition of the warming-up operation is satisfied using the second temperature T2 (Step S22). In the embodiment, the controller 60 determines that the second condition is satisfied when a measured value of the IC temperature sensor 38 is lower than a predetermined temperature (hereinafter, also referred to as a "second threshold temperature TB"). The second threshold temperature TB is set at the freezing point like the first threshold temperature TA. It is preferable that the second threshold temperature TB is set at any temperature enough to normally start up each accessory for use in operating the fuel cell 20. The second threshold temperature TB may be set at a temperature lower than the first threshold temperature TA or the freezing point depending on the startup performance of each accessory or may be set at a temperature higher than the first threshold temperature TA or the freezing point.

When determination is made that the second condition is satisfied (S22: YES), the controller 60 executes the warming-up operation (Step S24). The warming-up operation of Step S24 may be executed under the same condition as the warming-up operation of Step S14 or may be executed under a different condition from Step S14. As the warming-up operation under the different condition, for example, various warming-up operations, such as a warming-up operation in which a heat generation amount is different during rapid warming-up and a warming-up operation in which a circulation amount of the cooling medium or a circulation path of the cooling medium is different, can be employed. A warming-up operation to be executed can be decided under various conditions, such as a characteristic of an accessory, a distance or a disposition relationship between the fuel cell 20 and an accessory, and a state of thermal coupling to the fuel cell 20. The target heat generation amount of the fuel cell 20 may be set to a target value different from Step S14 based on a heat capacity of the accessory as the characteristic of the accessory, for example. When the second condition is not satisfied (S22: NO), the controller 60 ends the flow without executing the warming-up operation and starts the normal operation.

The controller 60 acquires the second temperature T2 when a given time has elapsed from the start of the warming-up operation (Step S26), and determines whether or not a predetermined warming-up completion condition is satisfied (Step S28). More specifically, the controller 60 determines that the warming-up completion condition is satisfied when the second temperature T2 is equal to or higher than a predetermined second end threshold temperature TBe. It is preferable that the second end threshold temperature TBe is set at a temperature to such an extent that the startup performance of each accessory in the fuel cell system 100 is not degraded, for example, at a temperature equal to or higher than the freezing point. For example, the second end threshold temperature TBe may be set at the same temperature as the second threshold temperature TB or the first end threshold temperature TAe or may be set at a temperature higher than the second threshold temperature TB or the first end threshold temperature TAe. The warming-up completion condition may be satisfied, for example, when a warming-up completion time calculated from the target heat generation amount has elapsed. When determination is made that the second temperature T2 is equal to or higher than the second end threshold temperature TBe (S28: YES), the controller 60 completes the warming-up operation to end the flow and starts the normal operation of the fuel cell 20. When the warming-up completion condition is not satisfied (S28: NO), the controller 60 returns to Step S24 and continues the warming-up operation until the warming-up completion condition is satisfied.

Figure 3:
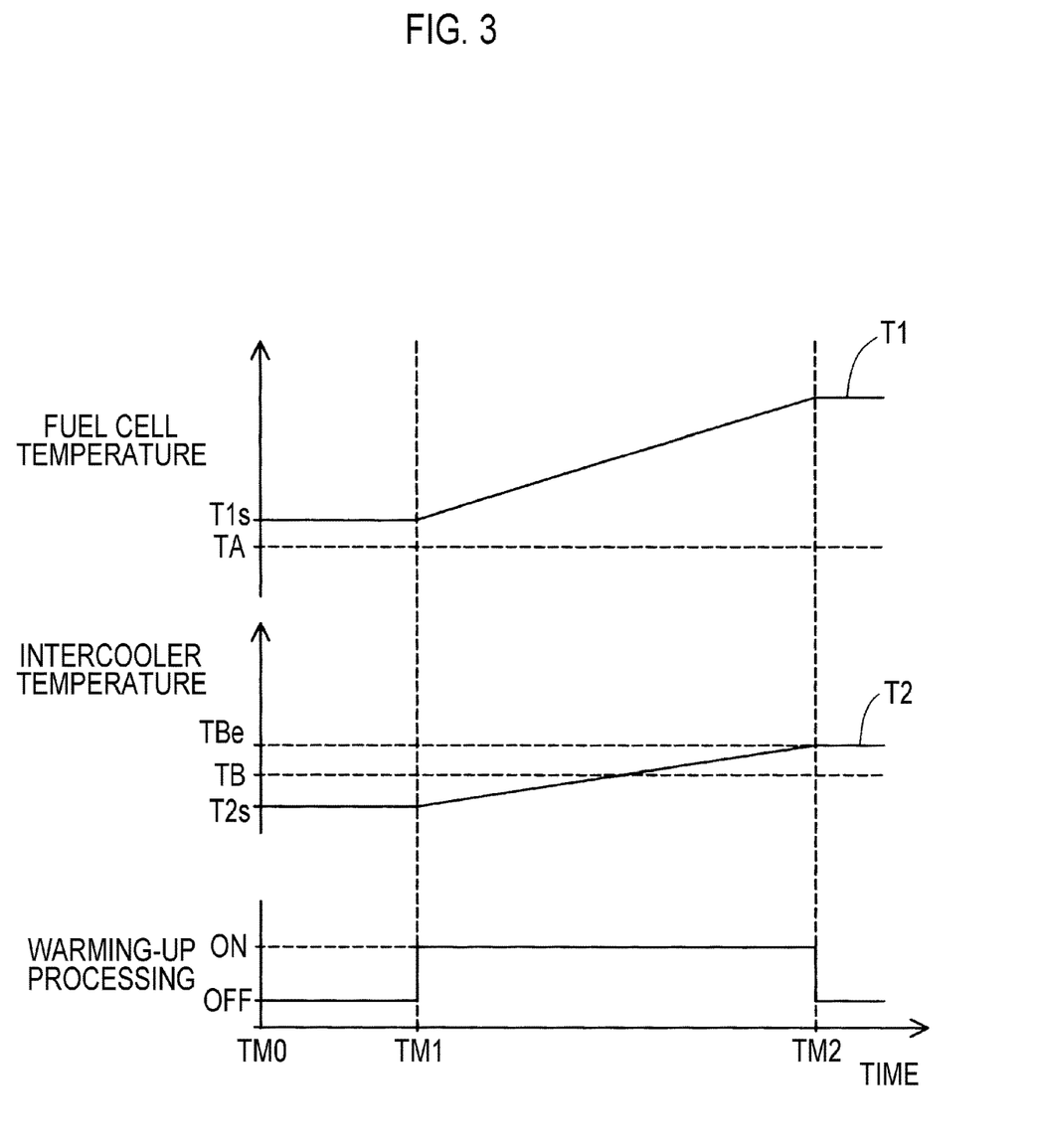
FIG. 3 is a timing chart showing a part of the startup processing.

FIG. 3 is a timing chart showing a part of the startup processing that is executed by the controller 60. In FIG. 3, in order from an uppermost stage, the temperature of the fuel cell 20 as the first temperature T1, the temperature of the intercooler 35 as the second temperature T2, and on-off control of the warming-up operation that is executed by the controller 60 are shown. The horizontal axis is a time axis, and the time axis of each item is consistent. Time TM0 shown in FIG. 3 means a start time of the startup processing. In a period from time TM0 to TM1, the first temperature T1 is a temperature T1s higher than the first threshold temperature TA, and the second temperature T2 is a temperature T2s lower than the second threshold temperature TB.

The controller 60 starts electric power generation of the fuel cell 20 with the start of the startup processing and acquires the first temperature T1 at time TM1. The first temperature T1 is the temperature T1s higher than the first threshold temperature TA, and the first condition is not satisfied. For this reason, the controller 60 acquires the second temperature T2 and determines whether or not the second condition is satisfied. The second temperature T2 is the temperature T2s lower than the second threshold temperature TB, and the second condition is satisfied. Accordingly, the controller 60 starts the warming-up operation.

With the start of the warming-up operation, the temperature of the fuel cell 20 increases after TM1. The temperature of the intercooler 35 increases due to heat transmission from the fuel cell 20 and reaches the second end threshold temperature TBe at TM2. The controller 60 determines that the warming-up completion condition is satisfied and completes the warming-up operation.

As described above, with the fuel cell system 100 of the embodiment, even though the first temperature T1 that is the temperature of the fuel cell 20 is higher than the first threshold temperature TA, when the second temperature T2 that is the temperature of the accessory is lower than the second threshold temperature TB, the controller 60 executes the warming-up operation. Even though the temperature of the fuel cell 20 is high to such an extent that the warming-up operation is not needed, when determination is made that the temperature of the accessory is low to such an extent that the warming-up operation is needed, the warming-up operation is executed. Accordingly, it is possible to reliably suppress or restrain freezing of the accessory, and to increase the startup performance of the entire fuel cell system 100.

With the fuel cell system 100 of the embodiment, the controller 60 acquires, as the second temperature T2, a temperature of an accessory that shows a temperature lower than the temperature of the fuel cell 20 in a period during which the fuel cell system 100 is stopped. The temperature of the accessory that shows the temperature lower than the temperature of the fuel cell 20 is used for the start condition of the warming-up operation, whereby it is possible to more reliably suppress or restrain freezing of the accessory.

With the fuel cell system 100 of the embodiment, the controller 60 acquires, as the second temperature T2, a temperature of an accessory that shows the lowest temperature in a period during which the fuel cell system 100 is stopped. Accordingly, it is possible to efficiently determine the need for the warming-up operation without using a temperature of another accessory for the start condition of the warming-up operation.

With the fuel cell system 100 of the embodiment, the temperature of the intercooler 35 is used as the second temperature T2. In general, the intercooler 35 is likely to be disposed at a position susceptible to an outside air temperature and tends to standardly include the IC temperature sensor 38 to acquire the temperature of cathode gas. Accordingly, it is possible to acquire the temperature of the accessory that shows a low temperature, and to efficiently determine a need for the warming-up operation, without adding a temperature sensor that is used for the start condition of the warming-up operation.

With the fuel cell system 100 of the embodiment, the controller 60 executes the warming-up operation after executing the hydrogen filling processing when the first condition is satisfied, and executes the warming-up operation without executing the hydrogen filling processing when the second condition is satisfied. Solely when the temperature of the fuel cell 20 is low to such an extent that the warming-up operation is needed, the hydrogen filling processing is executed, whereby it is possible to suppress wasteful consumption of fuel gas.

B. Second Embodiment

Figure 4:
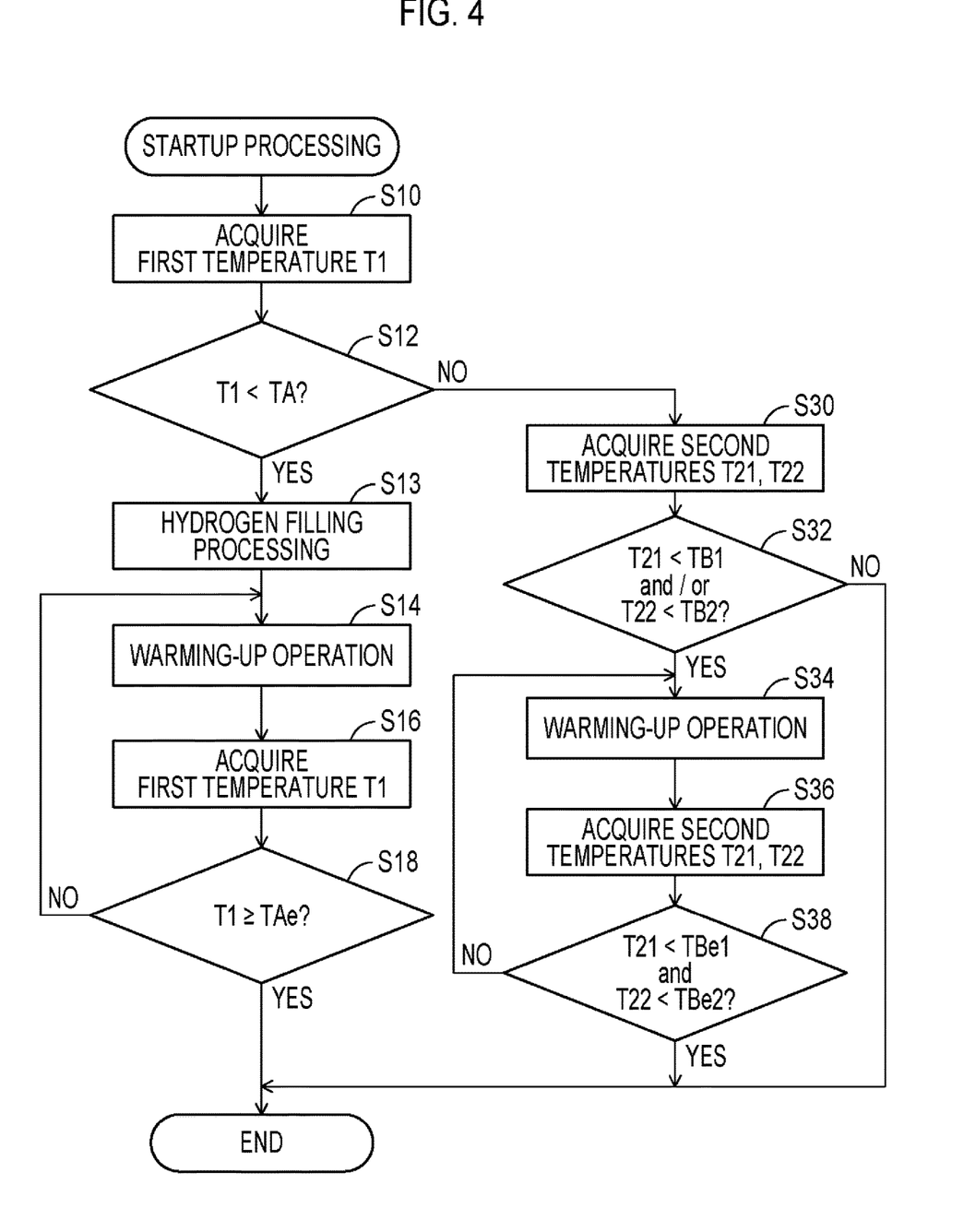
FIG. 4 is a flowchart showing startup processing that is executed by a fuel cell system of a second embodiment.

FIG. 4 is a flowchart showing startup processing that is executed by a fuel cell system 100 of a second embodiment of the present disclosure. In the fuel cell system 100 of the second embodiment, a part of the startup processing that is executed by the controller 60 is different from the first embodiment. More specifically, the startup processing that is executed by the fuel cell system 100 of the embodiment includes Step S30 to Step S38 instead of Step S20 to Step S28 shown as the first embodiment. Other configurations of the fuel cell system 100 are the same as those in the first embodiment.

As in the first embodiment, the controller 60 acquires the temperature of the fuel cell 20 as the first temperature T1 (Step S10), and determines whether or not the first condition is satisfied (Step S12). When the first condition is not satisfied (S12: NO), the controller 60 acquires the temperature of the intercooler 35 as a second temperature T21 and the temperature of the gas-liquid separator 57 as a second temperature T22 (Step S30). That is, in the embodiment, the controller 60 acquires the temperatures of two or more accessories as the second temperature. The controller 60 determines whether or not the second condition is satisfied using the acquired second temperatures T21, T22 (Step S32). In the embodiment, the second threshold temperature is set to a second threshold temperature TB1 corresponding to the second temperature T21 and a second threshold temperature TB2 corresponding to the second temperature T22. The controller 60 determines that the second condition is satisfied when at least any one of a condition that the acquired second temperature T21 is lower than the second threshold temperature TB1 or a condition that the second temperature T22 is lower than the second threshold temperature TB2 is satisfied. When the temperatures of the accessories are not needed for determining the start condition of the warming-up operation, in Steps S30 and S32, solely the temperature of one of the accessories, such as any one of the temperature of the intercooler 35 and the temperature of the gas-liquid separator 57, may be used.

When determination is made that the second condition is satisfied (S32: YES), the controller 60 executes the warming-up operation under the same condition as in Step S14 or Step S24 (Step S34). When the second condition is not satisfied (S32: NO), the controller 60 ends the flow without executing the warming-up operation and starts the normal operation.

In a case where a given time has elapsed from the start of the warming-up operation, the controller 60 acquires the second temperatures T21, T22 (Step S36), and determines whether or not the warming-up completion condition is satisfied (Step S38). In the embodiment, the controller 60 determines that the warming-up completion condition is satisfied when the temperatures of all of the two or more accessories exceed a predetermined second end threshold temperature. More specifically, the second end threshold temperature is set to a second end threshold temperature TBe1 corresponding to the second temperature T21 and a second end threshold temperature TBe2 corresponding to the second temperature T22. The controller 60 determines that the warming-up completion condition is satisfied when the second temperature T21 is higher than the second end threshold temperature TBe1 and the second temperature T22 is higher than the second end threshold temperature TBe2. The second end threshold temperature TBe1 and the second end threshold temperature TBe2 may be set at different temperatures based on various conditions, such as the heat capacity of an accessory, the distance or disposition relationship between each accessory and the fuel cell 20, and the state of thermal coupling to the fuel cell 20, or may be set at the same temperature. When determination is made that the warming-up completion condition is satisfied (S38: YES), the controller 60 completes the warming-up operation to end the flow and starts the normal operation of the fuel cell 20. When the warming-up completion condition is not satisfied (S38: NO), the controller 60 returns to Step S34 and continues the warming-up operation until the warming-up completion condition is satisfied.

Figure 5:
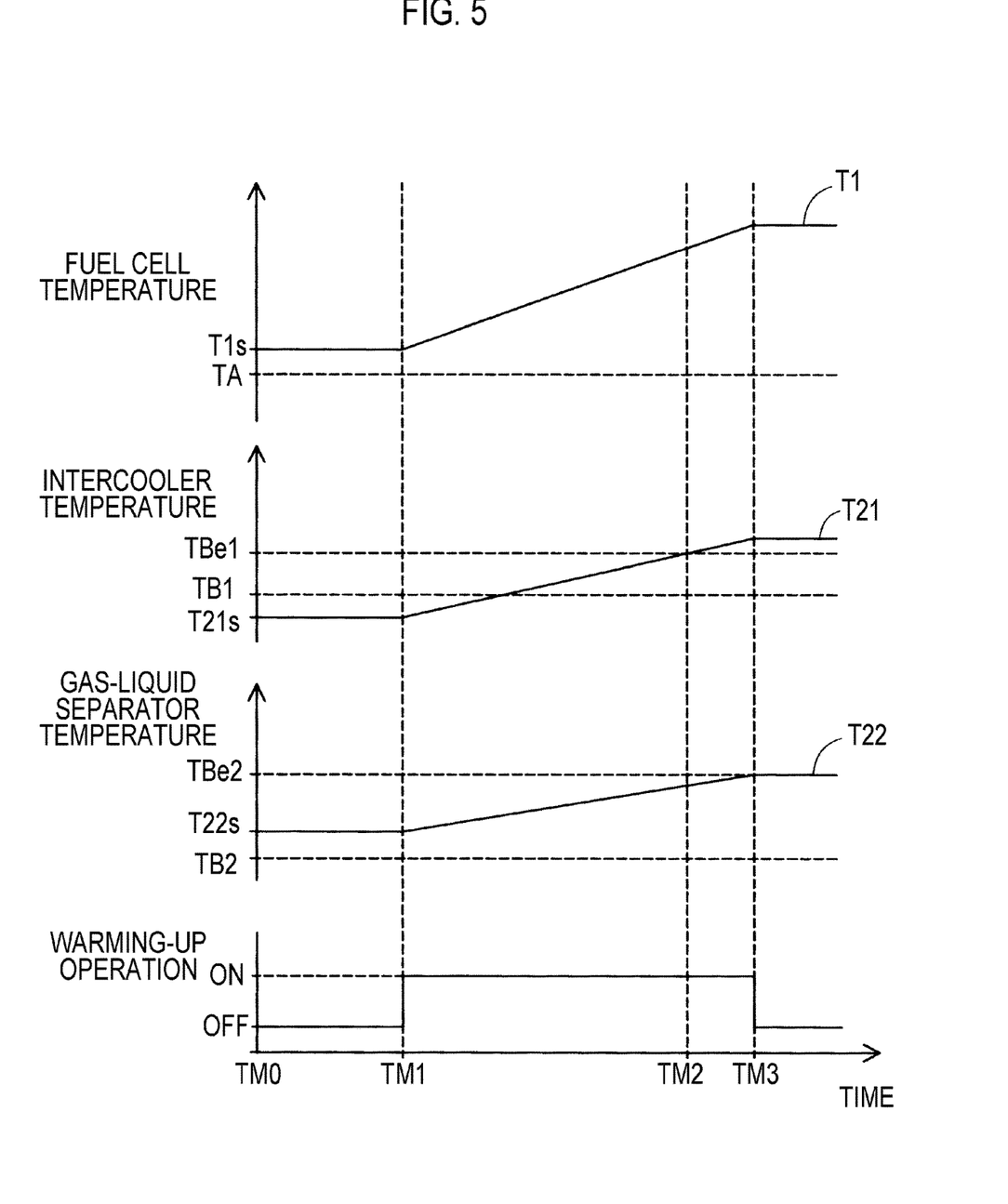
FIG. 5 is a timing chart showing a part of the startup processing that is executed by the fuel cell system of the second embodiment.

FIG. 5 is a timing chart showing a part of the startup processing that is executed by the fuel cell system 100 as the second embodiment. In FIG. 5, in order from an uppermost stage, the temperature of the fuel cell 20 as the first temperature T1, the temperature of the intercooler 35 as the second temperature T21, the temperature of the gas-liquid separator 57 as the second temperature T22, and on-off control of the warming-up operation that is executed by the controller 60 are shown. In a period from time TM0 that is a startup time of the startup processing to time TM1, the second temperature T21 is a temperature T21s lower than the second threshold temperature TB1, and the second temperature T22 is a temperature T22s higher than the second threshold temperature TB2.

At time TM1, while the second temperature T22 is equal to or higher than the second threshold temperature TB2, the second temperature T21 is lower than the second threshold temperature TB1. For this reason, the controller 60 determines that the second condition is satisfied and starts the warming-up operation. With the start of the warming-up operation, the temperatures of the intercooler 35 and the gas-liquid separator 57 increase with heat transmission from the fuel cell 20 along with an increase in temperature of the fuel cell 20. At time TM3, the second temperature T21 is equal to or higher than the second end threshold temperature TBe1, and the second temperature T22 reaches the second end threshold temperature TBe2. Accordingly, the controller 60 determines that the warming-up completion condition is satisfied and ends the warming-up operation.

With the fuel cell system 100 of the embodiment, the controller 60 acquires the temperatures of two or more accessories as the second temperatures T21, T22 and ends the warming-up operation when the temperature of each accessory is equal to or higher than the predetermined second end threshold temperature TBe1 or TBe2. The temperatures of the accessories are used for the completion condition of the warming-up operation, it is possible to sufficiently increase the temperature of each accessory even though a gradient of an increase in temperature of each accessory due to the warming-up operation is different, such as when each accessory has a different heat capacity or has a different distance from the fuel cell 20, and to reliably suppress or restrain freezing of each accessory.

C. Other Embodiments (C1) In the above-described first embodiment, for the start condition of the warming-up operation, the temperature of the intercooler 35 as an accessory showing the lowest temperature in the stop period of the fuel cell system 100 among the accessories is used as the second temperature T2. In contrast, a temperature of an accessory other than an accessory showing a temperature lower than the temperature of the fuel cell 20 in the stop period of the fuel cell system 100, such as a temperature of an accessory having the largest heat capacity among the accessories in the fuel cell system 100 as the second temperature, may be used as the second temperature, and a temperature of an accessory other than an accessory showing the lowest temperature may be used as the second temperature. With the fuel cell system 100 of this embodiment, the start condition and the completion condition of the warming-up operation are determined based on an accessory of which the temperature hardly increases with the warming-up operation, whereby it is possible to sufficiently increase the temperature of each accessory at the time of completion of the warming-up operation, and to more reliably suppress or restrain freezing of the accessory.

(C2) In the above-described second embodiment, the controller 60 determines that the warming-up completion condition is satisfied when the temperatures of all of the two or more accessories exceed the predetermined second end threshold temperature. In contrast, when the temperatures of two or more accessories among the accessories are acquired to execute the warming-up operation, for example, the controller 60 may use the acquired temperatures of the two or more accessories in any combination to determine whether or not the warming-up completion condition is satisfied. As the combination, the following combinations 1) to 4) can be employed.

1) A temperature of any one accessory, such as an accessory showing the lowest temperature
2) Temperatures of a plurality of optional accessories set in advance
3) Temperatures of all accessories
4) An average value of acquired temperatures of accessories (C3) In the respective embodiments described above, a part or all of the functions and the processing realized by software may be realized by hardware. Furthermore, a part or all of the functions and the processing realized by hardware may be realized by software. As hardware, for example, various circuits, such as an integrated circuit, a discrete circuit, and a circuit module formed by combining such circuits, can be used.

The present disclosure is not limited to the above-described embodiments, and can be realized by various configurations without departing from the scope of the disclosure. For example, the technical features of the embodiments corresponding to the technical features in the aspect described in SUMMARY OF THE INVENTION may be appropriately replaced or combined to solve a part or all of the above-described problems or achieve a part or all of the above-described effects. Furthermore, unless the technical features are described as needed in the specification, such technical features may be deleted appropriately.

What is claimed is:

1. A fuel cell system comprising:
a fuel cell;
a first temperature sensor configured to acquire a first temperature that is a temperature of the fuel cell;
a plurality of accessories that is used to operate the fuel cell;
a second temperature sensor configured to acquire a second temperature that is a temperature of at least any one of the plurality of accessories; and
a controller configured to perform control on the plurality of accessories to execute a warming-up operation of the fuel cell,
wherein the controller is configured to execute the warming-up operation when a first condition that the first temperature is equal to or higher than the first threshold temperature and the second temperature is lower than a predetermined second threshold temperature is satisfied.

2. The fuel cell system according to claim 1, wherein the second temperature is a temperature of an accessory that shows a temperature lower than the temperature of the fuel cell in a period during which the fuel cell system is stopped, among the plurality of accessories.

3. The fuel cell system according to claim 2, wherein:
the plurality of accessories include an intercooler configured to cool cathode gas that is supplied to a cathode of the fuel cell; and
the second temperature is a temperature of the intercooler.

4. The fuel cell system according to claim 2, wherein the plurality of accessories include an intercooler configured to cool cathode gas that is supplied to a cathode of the fuel cell;
wherein the controller is configured to execute the warming-up operation when an accessory other than the intercooler among the plurality of accessories in the fuel cell system shows a lowest temperature, and
wherein the second temperature is the lowest temperature.

5. The fuel cell system according to claim 1, wherein the controller is configured to
execute the warming-up operation after performing control on the plurality of accessories to execute anode gas filling processing of filling an anode of the fuel cell with anode gas when the first condition is satisfied, and
execute the warming-up operation without executing the anode gas filling processing when the first condition is satisfied.

6. The fuel cell system according to claim 1, wherein the controller is configured to, when temperatures of two or more accessories among the plurality of accessories are acquired as the second temperature to execute the warming-up operation, determine whether or not to end the warming-up operation using the temperatures of the two or more accessories.

7. The fuel cell system according to claim 1, wherein the controller is configured to execute the warming-up operation if a second condition that the first temperature is lower than a predetermined first threshold temperature is satisfied.

* * * * *